UNITED STATES PATENT OFFICE.

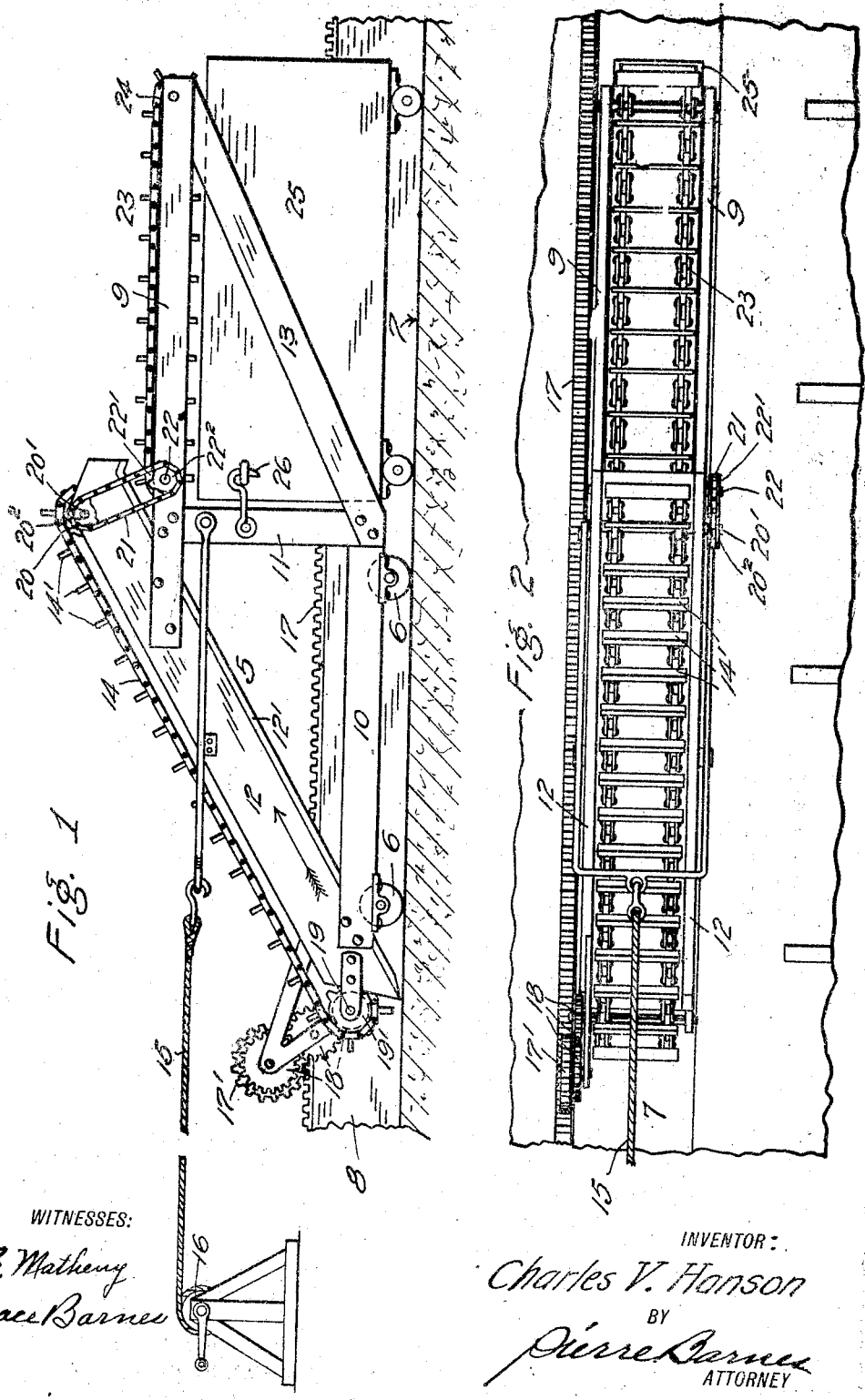

CHARLES V. HANSON, OF FALL CITY, WASHINGTON.

VEHICLE LOADING APPLIANCE.

1,039,935.  Specification of Letters Patent.  Patented Oct. 1, 1912.

Application filed March 18, 1912. Serial No. 684,529.

*To all whom it may concern:*

Be it known that I, CHARLES V. HANSON, a citizen of the United States, residing at Fall City, in the county of King and State of Washington, have invented certain new and useful Improvements in Vehicle Loading Appliances, of which the following is a specification.

This invention relates to mechanical shoveling devices such as are utilized for loading vehicles and is especially designed for the collection and removal of accumulations of manure and other refuse from the gutters of cow barns.

The object of the invention is the provision of efficient appliances of this character which are easy to operate.

The invention is illustrated in the accompanying drawings, in which—

Figure 1 is a side elevation, and Fig. 2 is a plan view.

A machine constructed in accordance with the present invention comprises a body frame 5 mounted upon vehicle wheels 6 which are adapted to track upon the bottom 7 of a gutter 8, as customarily used at the rear of the stalls provided for the animals in a cow barn. Said body frame may be constructed in any suitable manner but I preferably make the same of a pair of vertically disposed and parallel trusses each of which consists of horizontal upper and lower members 9 and 10, an upright post 11 therebetween and inclined members 12 and 13, respectively connecting the front and rear ends of said horizontal members, as shown in Fig. 1. These trusses are spaced apart so that the lower portion of the frame will operate in the gutter 8. The trusses are connected by suitable transverse elements to afford rigidity to the frame.

To the underside of the inclined members 12 is connected a plate 12' and constitutes therewith a conveyer trough which extends from near the bottom 7 of said gutter to a distance above the members 9. Operating within the trough is an elevator chain 14 provided with attachments, or flights, 14' which, upon traveling in the direction indicated by arrow in Fig. 1, elevates the refuse or manure which is scooped into the mouth of the trough as the machine is progressively advanced. To accomplish forward travel of the machine, I preferably employ a drag line 15 connected to the machine frame and connected to a winding drum 16 of a winch.

At one side of the gutter 8 is secured a rack 17 which is engaged by a pinion 17' which, in turn, is operatively connected by a train of gear wheels 18 with the shaft 19 of the sprocket wheel 19' which carries the lower end of the elevator chain. The other sprocket wheel 20 for this chain has mounted upon its shaft 20' a second sprocket wheel $20^2$ for a chain belt 21 which drives a shaft 22 through the medium of a sprocket wheel $22^2$. The shaft 22 has also mounted thereon a sprocket wheel 22' about which passes one end of a chain conveyer 23. 24 represents the other sprocket wheel for the conveyer.

The conveyer 23 is arranged horizontally, or nearly so, and operates between the truss members 9.

25 represents a vehicle body or box of less width than the distance between the trusses of the aforesaid body frame or at least of the rear portion thereof to enable the vehicle to be positioned between the frame members 13 and below the conveyer. Means, such as a hook 26 upon the body frame, is used upon occasion for coupling the vehicle therewith.

In operating the machine the vehicle 25 is first coupled with the body frame, and is drawn forwardly therewith by operating the winch. As the body-frame and vehicle are thus advanced pinion 17' is rotated by the rack to cause the elevator 14 to be driven and thereby effect the elevation of manure through the trough and its discharge into the front end of the vehicle box. Meanwhile the conveyer is operating and when the manure has been piled of sufficient height at the front end of the box, the conveyer serves to distribute the manure through the entire length of the box and to a uniform height. When thus loaded the machine is temporarily stopped and, after being uncoupled, the vehicle is manually pushed toward the rear and emptied of its contents. After being unloaded the vehicle is returned to the body-frame and upon being again coupled therewith the machine is moved forward to have the vehicle loaded, and so on.

Ordinarily, the cleaning of the gutter would be done once a day unless the cows are kept continuously in the barn when several cleanings would be necessary. When unemployed, the machine is moved out of the way.

What I claim, is—

1. In a machine of the class described, the combination with a stationary rack, of a body frame comprising a pair of vertically-disposed parallel trusses consisting of upper and lower horizontal members, an inclined trough connecting the forward ends of said horizontal members, an elevating chain traveling in said trough, and gearing between the rack and chain for operating the latter as the body frame is moved forward.

2. In a machine of the class described, the combination with a stationary rack, of a body frame comprising a pair of parallel trusses, an inclined trough connecting the forward ends of said trusses, an elevating chain traveling in said trough, gearing between the rack and chain for operating the latter as the body frame is moved forward, and a horizontally-disposed conveyer chain operating simultaneously with said elevating chain.

3. In a machine of the class described, the combination with a stationary rack, of a body frame comprising a pair of vertically disposed parallel trusses consisting of upper and lower horizontal members, an inclined trough connecting the forward ends of said horizontal members, an elevating chain traveling in said trough, gearing between the rack and chain for operating the latter as the body frame is moved forward, a receptacle disposed beneath the upper horizontal members to receive the discharge from the elevating chain, and a conveyer chain arranged above the receptacle and operated simultaneously with the elevating chain.

Signed at Fall City, Wash., this 7th day of March 1912.

CHARLES V. HANSON.

Witnesses:
 DESSIE BAXTER,
 N. R. HARSHMAN.